US00RE43113E

(19) United States
(12) Reissued Patent
Kjellberg et al.

(10) Patent Number: US RE43,113 E
(45) Date of Reissued Patent: Jan. 17, 2012

(54) DOMAIN-BASED MANAGEMENT OF DISTRIBUTION OF DIGITAL CONTENT FROM MULTIPLE SUPPLIERS TO MULTIPLE WIRELESS SERVICES SUBSCRIBERS

(75) Inventors: Rikard M. Kjellberg, Santa Cruz, CA (US); Sheng Liang, Cupertino, CA (US); Tomas G. Lund, Menlo Park, CA (US); William Chan, San Mateo, CA (US)

(73) Assignee: Openwave Systems Inc., Redwood City, CA (US)

(21) Appl. No.: 12/622,322

(22) Filed: Nov. 19, 2009

Related U.S. Patent Documents

Reissue of:
(64) Patent No.: 7,299,033
Issued: Nov. 20, 2007
Appl. No.: 10/601,022
Filed: Jun. 19, 2003

U.S. Applications:
(60) Provisional application No. 60/393,024, filed on Jun. 28, 2002, provisional application No. 60/392,383, filed on Jun. 28, 2002, provisional application No. 60/393,041, filed on Jun. 28, 2002, provisional application No. 60/392,999, filed on Jun. 28, 2002.

(51) Int. Cl.
*H04M 3/42* (2006.01)
*G06F 15/16* (2006.01)

(52) U.S. Cl. ..... 455/414.1; 705/26; 705/27; 709/217; 709/219

(58) Field of Classification Search ..... 705/26–27; 455/414.1
See application file for complete search history.

(56) References Cited

U.S. PATENT DOCUMENTS

| | | | | |
|---|---|---|---|---|
| 5,835,724 | A | 11/1998 | Smith | |
| 5,895,471 | A | 4/1999 | King et al. | |
| 6,049,892 | A | 4/2000 | Casagrande et al. | |
| 6,076,166 | A | 6/2000 | Moshfeghi et al. | |
| 6,161,140 | A * | 12/2000 | Moriya | 709/228 |
| 6,167,441 | A | 12/2000 | Himmel | |

(Continued)

FOREIGN PATENT DOCUMENTS

EP 0992922 A2 4/2000

(Continued)

OTHER PUBLICATIONS

Ellipsus White Paper—InfiteMAP, Ellipsus' Mobile Application Provisioning System, 2 cover pages, pp. 1-9, and 1 post page, appears to be a web page, dated Feb. 12, 2001.*

(Continued)

*Primary Examiner* — Marivelisse Santiago Cordero

(57) ABSTRACT

A network server system includes a download manager that manages the publication, purchase and delivery of digital content from multiple content suppliers to wireless services subscribers in multiple domains. Each domain is defined as a different grouping of subscribers, such as a wireless carrier or subsidiary thereof, a business enterprise, or other defined group of subscribers. The download manager maintains data defining the multiple domains and associations between the domains and wireless services subscribers. Digital content suppliers can publish and manage their products on the server system via a computer network and make their products available to the subscribers for purchase or licensing. The subscribers in each of the domains can access the server remotely to purchase rights to download and use the digital content on associated wireless communication devices.

34 Claims, 14 Drawing Sheets

U.S. PATENT DOCUMENTS

| | | | | |
|---|---|---|---|---|
| 6,223,289 | B1 | 4/2001 | Wall et al. | |
| 6,275,692 | B1 | 8/2001 | Skog | |
| 6,311,215 | B1 | 10/2001 | Bakshi et al. | |
| 6,438,576 | B1 | 8/2002 | Huang et al. | |
| 6,460,020 | B1 * | 10/2002 | Pool et al. | 705/26 |
| 6,587,880 | B1 | 7/2003 | Saigo et al. | |
| 6,721,554 | B2 * | 4/2004 | Gnesda et al. | 455/406 |
| 6,785,769 | B1 * | 8/2004 | Jacobs et al. | 711/118 |
| 7,013,285 | B1 * | 3/2006 | Rebane | 705/10 |
| 7,013,289 | B2 * | 3/2006 | Horn et al. | 705/26 |
| 2001/0037192 | A1 * | 11/2001 | Shimamoto et al. | 704/8 |
| 2001/0047477 | A1 | 11/2001 | Chiang | |
| 2001/0056493 | A1 * | 12/2001 | Mineo | 709/227 |
| 2002/0052800 | A1 * | 5/2002 | Azuma | 705/26 |
| 2002/0065944 | A1 | 5/2002 | Hickey et al. | |
| 2002/0078253 | A1 | 6/2002 | Szondy et al. | |
| 2002/0194219 | A1 | 12/2002 | Bradley et al. | |
| 2002/0194473 | A1 | 12/2002 | Pope et al. | |
| 2003/0017826 | A1 | 1/2003 | Fishman et al. | |
| 2003/0022657 | A1 * | 1/2003 | Herschberg et al. | 455/414 |
| 2003/0060188 | A1 * | 3/2003 | Gidron et al. | 455/408 |
| 2003/0084165 | A1 | 5/2003 | Kjellberg et al. | |
| 2003/0101329 | A1 | 5/2003 | Lahti et al. | |
| 2004/0024867 | A1 | 2/2004 | Kjellberg | |
| 2004/0054786 | A1 | 3/2004 | Kjellberg et al. | |
| 2005/0071418 | A1 | 3/2005 | Kjellberg et al. | |

FOREIGN PATENT DOCUMENTS

| | | | |
|---|---|---|---|
| WO | WO 98/35469 | A2 | 8/1998 |
| WO | WO 98/35469 | A3 | 8/1998 |
| WO | WO 99/08208 | A1 | 2/1999 |
| WO | WO 99/26159 | A2 | 5/1999 |
| WO | WO 00/44147 | A1 | 7/2000 |
| WO | WO 00/70826 | A2 | 11/2000 |
| WO | WO 01/97482 | A1 | 12/2001 |
| WO | WO 02/23857 | A2 | 3/2002 |
| WO | WO 02/27543 | A2 | 4/2002 |

OTHER PUBLICATIONS

"GPRS-Applicability and Expectations", Erik Bladh et al., pp. 1-64, Aug. 2002.*

Gerhard Australler et al., "Gulliver Beans: Generating Device Optimized and Individualized Content for WAP Applications", Proc. Workshop Information Design for Mobile Web Services, [Online] May 15, 2000, pp. 1-7, XP-002266242.

"A Vision for Dynamic Java Services Provisioning, The Java Services Vending Machine Concept", Jun. 2001, pp. 1-25, Version 1.0, Sun Microsystems, Inc., Palo Alto, California.

Sheila Riley, "Sun-Microsoft Spat Now Carrying Over To Wireless World", 1 page, Investor's Business Daily.

* cited by examiner

DOMAIN-BASED MANAGEMENT OF DISTRIBUTION OF DIGITAL CONTENT FROM MULTIPLE SUPPLIERS TO MULTIPLE WIRELESS SERVICES SUBSCRIBERS

Matter enclosed in heavy brackets [ ] appears in the original patent but forms no part of this reissue specification; matter printed in italics indicates the additions made by reissue.

This application claims the benefit of U.S. provisional patent application nos: 60/393,024; 60/392,383; 60/393,041; and 60/392,999, each of which was filed on Jun. 28, 2002, and each of which is incorporated herein by reference.

FIELD OF THE INVENTION

At least one embodiment of the present invention pertains to systems and methods for providing digital content to wireless services subscribers, and more particularly, to facilitating management and delivery of digital content from multiple content suppliers to multiple wireless services subscribers in multiple domains.

BACKGROUND

Personal mobile communication/computing devices, such as cellular telephones, personal digital assistants (PDAs) and two-way pagers, have become commonplace in many countries. These devices are referred to collectively herein as "mobile devices" or "wireless devices". The current state-of-the-art of mobile devices has advanced far beyond that of their predecessors. For example, early cellular telephones were used analog signals to communicate over wireless telecommunications networks (or simply "wireless networks") and were nothing more than mobile telephones. Today's cellular telephones typically are all digital and provide many other functions in addition to telephony capability. For example, many of the latest generation of mobile telephones (and other mobile devices) allow their users to play games, access World Wide Web pages, exchange email, exchange and download files, exchange short messaging service (SMS) messages, and send and receive video.

With new mobile devices providing a wider range of capabilities, there is increasing demand among the users of these devices (i.e., wireless services subscribers) for new and interesting types of digital content that can be used on these mobile devices, such as games and other applications, images, ring tones, screensavers, wallpapers, etc. Although newer mobile devices often come pre-provisioned with certain digital products when first acquired by the subscriber, it is desirable to allow subscribers to acquire additional digital products for use in their mobile devices as such products become available. While this capability already exists, currently subscribers acquire digital content directly from the content suppliers (typically via the wireless network and the Internet). This process is inconvenient if a subscriber wishes to acquire various different items of digital content from different suppliers, since the subscriber must navigate to the web sites of different suppliers. Therefore, it is further desirable to make many different types of digital content available to subscribers at one time through a centralized "store".

From the content supplier's perspective, another impediment to the efficient distribution of digital content is the fact that different mobile devices often require different content packaging formats and provisioning protocols. In order to make a given item of digital content available to multiple mobile devices supporting different provisioning models, a digital content supplier will normally deploy that item of content multiple times, packaging it differently for each of the provisioning models. For example, an image to be delivered to Nokia-COD phones and Sprint-GCD OTA phones would be deployed twice, custom-packaged for each of those two delivery modes. It is very burdensome for digital content suppliers to have to package and provision the digital content they produce in a manner that is suitable for all of the devices in the marketplace. Moreover, it is difficult for content suppliers to keep up with the constant changes in device capabilities for the many mobile devices in the marketplace. Consequently, there is often a gap between the interoperability of a given digital product and how effective it can be used on a device. Therefore, the problem exists of how to efficiently allow many digital content providers to distribute many different types of digital content to subscribers using many different types of mobile devices.

A related problem is how to charge subscribers for the digital content they acquire. In one known system. The wireless carrier's system is capable of connecting to an external billing system and provides billing events to that system when a subscriber performs a chargeable action. However, this scenario assumes that all subscribers belong to a single organization that also owns the billing system. Furthermore, it assumes that a single currency is used. Yet many multi-national organizations have a parent company with subsidiaries in many countries. Different countries have different currencies, taxes and other charges. Each subsidiary may implement its own support/business infrastructure to deal with local regulations and customs, particularly with respect to the billing process. Consequently, the carrier's system must be able to generate billing events and direct them to the appropriate external billing system. Furthermore, it must be able to present the customer with a charge for each service, in the applicable currency and expressed in a way that is appropriate considering local taxes, fees and other regulations.

One way to address this problem, which only partially solves it, is to use credit card systems. In this scenario, the credit card company acts as an intermediary in the billing process. This approach consolidates all billing at one point. Settlement is done between the product/service provider and the subscriber provider (e.g., the wireless carrier) for a fee. This approach, however, does not handle the currency, taxes, fees and regulations issues mentioned above.

SUMMARY OF THE INVENTION

The invention includes a method and apparatus for providing access to digital content for use on wireless communication devices. A server system maintains data defining multiple domains, each of the domains defined as a different subset of multiple wireless services subscribers. The server system enables multiple digital content suppliers to publish digital content on the server system via a computer network and to make the digital content available on the server system to the wireless services subscribers. The server system further enables subscribers in each of the multiple domains to purchase rights to download and use the digital content on associated wireless communication devices via at least one wireless network.

Other features of the present invention will be apparent from the accompanying drawings and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A system and method for efficiently managing the publication, purchase and delivery of digital content from multiple content suppliers to multiple wireless services subscribers in multiple domains are described below. As used in this description, the terms "digital content", "digital product", "content", and "product" are used interchangeably and mean software and/or data embodying things such as games and other applications, applets or the like; images; screensavers; wallpaper; ring tones; etc., particularly (but not necessarily exclusively) those designed for use in mobile devices such as cellular telephones, personal digital assistants (PDAs), and other small-footprint wireless/mobile devices. For convenience the terms "purchase" or "buy" are used to mean either actual purchase or any other conventional way in which a subscriber can acquire rights to use digital content (e.g., by acquiring a license).

Overview

As described in greater detail below, a system which manages publication, purchase and delivery of digital content is implemented in a network server system that includes one or more server computer systems on a network. The server system includes an application server referred to herein as the "download manager". Digital content suppliers can publish and manage their products using the download manager via a computer network, such as the Internet, and can make their products available to wireless services subscribers through the download manager for purchase or licensing. Subscribers can access the server system via wireless networks to purchase rights to download and use the digital content on their wireless communication devices.

Figure 1:
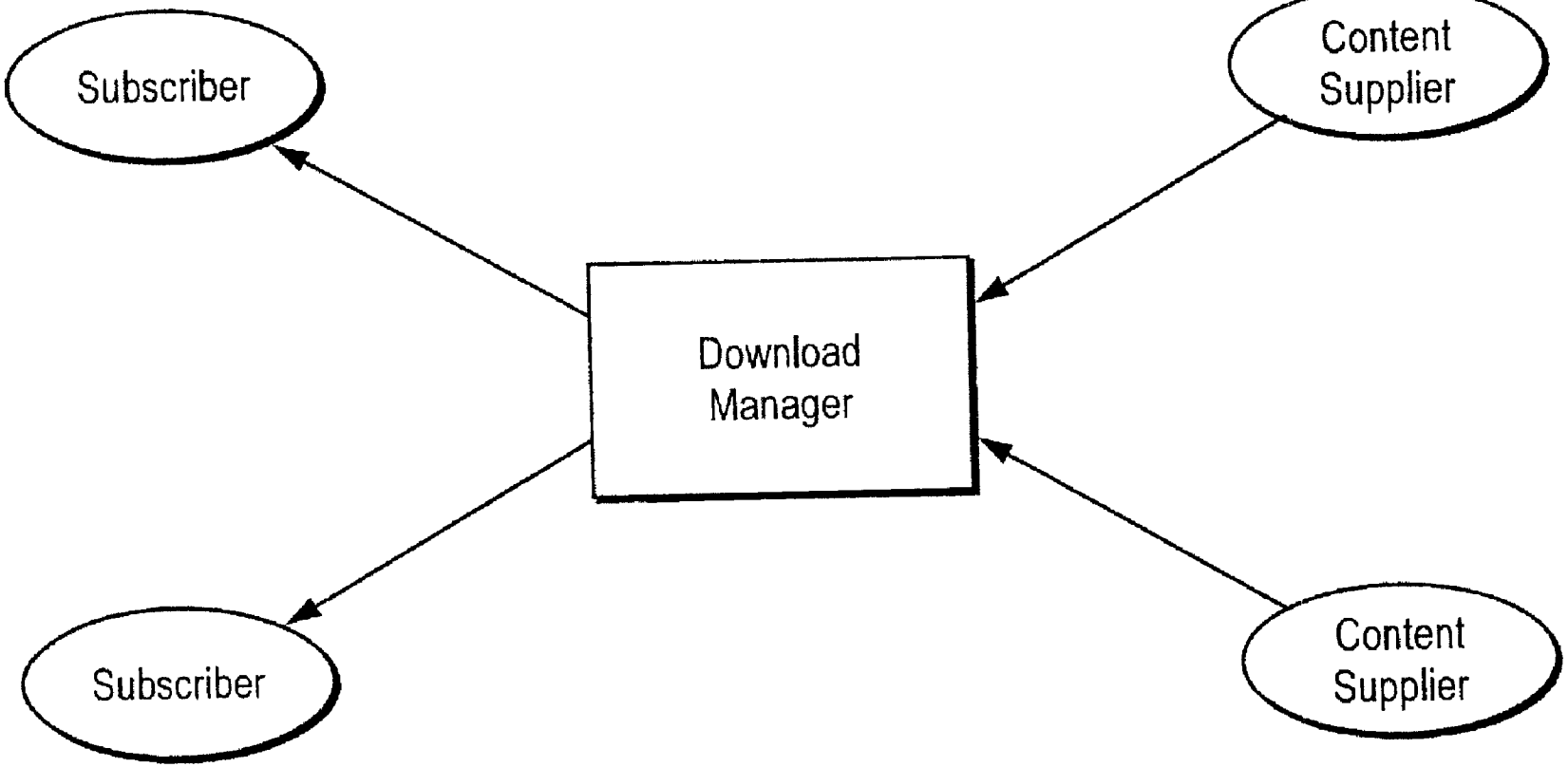
FIG. 1 illustrates the relationship between the download manager, content suppliers, and subscribers.

FIG. 1 illustrates the relationship between the download manager, content suppliers, and wireless services subscribers (users of mobile devices). The download manager 1 acts as an intermediary between multiple content suppliers 2 (e.g., 2A, 2B, etc.) and multiple customers (e.g., 3A, 3B, etc.), e.g., wireless services subscribers, belonging to multiple "domains". In the supply chain process for distribution of digital content, a content supplier 2 adds a digital product to the set of products managed by the download manager 1 (i.e., products "in the store"). The supplier 2 then associates various attributes with the product. Once the product has been submitted to the product store, a product administrator associated with the download manager 1 verifies its quality and determines whether it should be made available to the customers 2 or if it should be rejected. Once the product is approved, customers 2 can buy the product by accessing the download manager 1 from their client devices.

To facilitate description, it is henceforth assumed herein that the customers are users of mobile devices and, therefore, are subscribers of warless services (although that need not be the case); thus, customers are henceforth called "subscribers" herein. Note, however, that the techniques described herein need not be limited to wireless services subscribers or mobile client devices.

Domains and Partner Management

Among other advantageous features, the download manager 1 facilitates partner management. A "partner", as the term is used herein, is an entity that holds a relationship to a subscriber for purposes of delivery of digital products, billing, returns, etc. For example, a partner can be an Internet portal, an Internet Service Provider (ISP), a wireless carrier, an application service provider (ASP), etc. A partner also appoints a number of content suppliers to supply products to the product store. Partner management is the concept of being able to assign responsibility for various parts of the digital product supply chain to different categories of users.

The entities "within the store" (managed by the download manager 1) belonging to a partner are partitioned into entities called "domains". A "domain", as the term is used herein, is an entity, defined in the download manager 1, that describes the billing relationship between a partner and a set of subscribers, as well as describing a partitioning of product space and administrative responsibilities. As such, a domain can represent a grouping of wireless services subscribers, such as a wireless carrier or a subsidiary of a wireless carrier, a business enterprise, or any other defined group of wireless services subscribers. The domain manager maintains a database of data defining the associations between domains and partners, administrators, subscribers and products.

Domains facilitate the proper billing of subscribers from multiple organizations and/or with multiple wireless carriers (or other subscriber providers), and facilitate presentation of product descriptions to subscribers in the languages and currencies appropriate for their local countries or regions.

The domain entity is also used in the download manager 1 to classify other entities as belonging to a domain 1-to-1, belonging to a domain 1-to-many, many-to-many, or not belonging to a domain. In general, a domain captures the following relationships to the subscribers:

1) how subscribers are charged for the products they purchase and in which currency;

2) to which user groups the subscribers can belong;

3) from which product categories the subscribers can select products; and 4) which products are accessible to the subscribers.

In certain embodiments of the invention, a domain has the following properties:

a name (localized)

a description (localized)

a uniform resource locator (URL) to a web site giving further description of the domain a contact address including contact person, contact telephone numbers, fax numbers and postal address the currency to use for billing and display purposes reference to handlers for various different payment models (e.g., online payment, pre-payment and post-payment)

a set of references to rating handlers used for adjustment of product prices

The name and the descriptions have localized values for the set of languages registered in the system.

The distinction between domain entities and non-domain entities also forms the basis for delegated administration. More specifically, for each domain, the responsibility for supplying products, approving or rejecting products, etc. can be delegated to different suppliers and administrators. Thus, each domain is associated with a set of administrators that handle the products in the store. In certain embodiments of the invention, these administrators include a system administrator, a domain administrator, a product administrator, and a customer care administrator.

The system administrator is the overall administrator for the download manager 1, who can create new domains and their respective domain administrators to help regulate it. He also maintains the ability to control non-domain entities such as devices, content types, etc. The domain administrator is the overall administrator for a given domain. He has the ability to manage all of the suppliers and subscribers for his domain as well as create product and customer care administrators for the domain. The product administrator is responsible for managing the entire product lifecycle for the content submitted by the domain's suppliers. The customer care administrator is responsible for managing subscribers belonging to the domain. Each subscriber belongs to only one domain and can only see products for the domain to which he belongs.

A partner appoints a number of content suppliers who provide products to the product store. A supplier can only submit products to the domain(s) to which he belongs. The relationship between suppliers and domains is many-to-many. Products are approved and deployed separately for each domain.

From the content supplier's perspective, all entities in the download manager 1 that are domain-related are only selectable based on the domains to which the supplier can provide products. For example, a supplier can only choose from among the product categories and license models that belong to the domains to which the supplier has the right to supply products.

Network Environment

Figure 2:
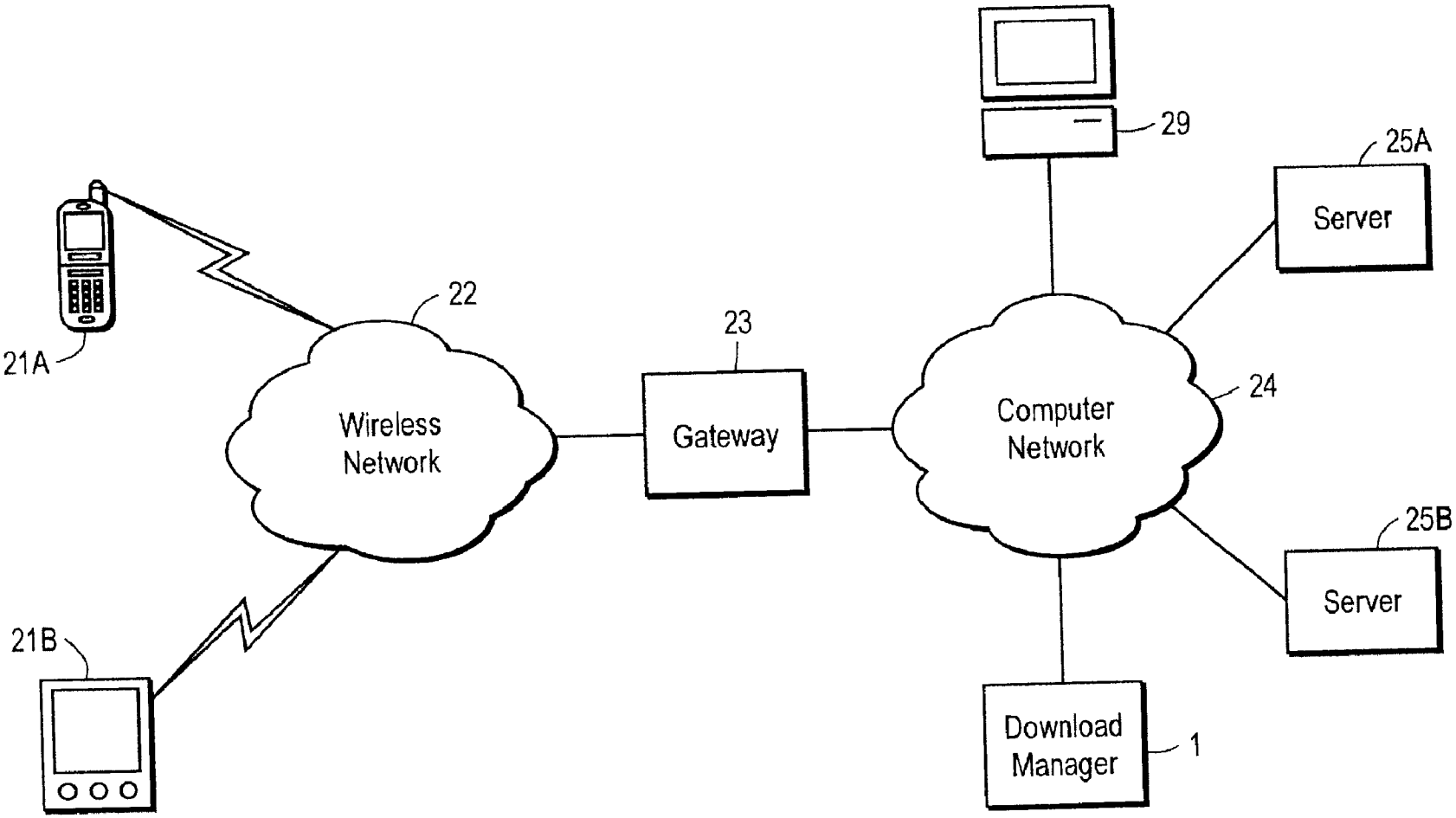
FIG. 2 shows a network architecture in which a download manager in accordance with the invention can be deployed.

FIG. 2 shows a network architecture in which a download manager in accordance with the invention can be advantageously deployed. One or more wireless networks 22 are connected to a computer network 24 through corresponding gateways 23. The computer network 24 may be the Internet, although alternatively, it could be essentially any other type of computer network, such as a corporate intranet, a local area network (LAN), etc., or a combination of such networks.

A number of mobile client devices 21 (e.g., 21A, 21B, etc.) operate on each wireless network 22. A number of servers 25 (e.g., 5A, 5B, etc.) operate on the computer network 24 to provide a variety of services for the mobile devices 21 and/or to one or more non-mobile client devices 29 coupled to the computer network 24. For example, the servers 25 may include World Wide Web servers, file servers, application servers, etc.

Each gateway 23 is operated by the wireless carrier of the wireless network to which it is directly connected. Each gateway 23 provides an interface between a particular wireless network 22 and the computer network 24 (e.g., the Internet), providing routing and, if necessary, appropriate protocol translation and/or content transcoding. In some cases, the gateway 23 may be a standalone device or system. In other cases, the gateway 3 may be part of a more-capable server system that provides additional value-added services to users of client devices 21; such as a proxy service 27, a provisioning manager 28, etc.

A download manager 1 in accordance with the present invention is connected to the computer network 24, either directly (as shown) or indirectly. The download manager 1 can be, but does not have to be, operated by a wireless carrier.

Download Manager

Figure 3:
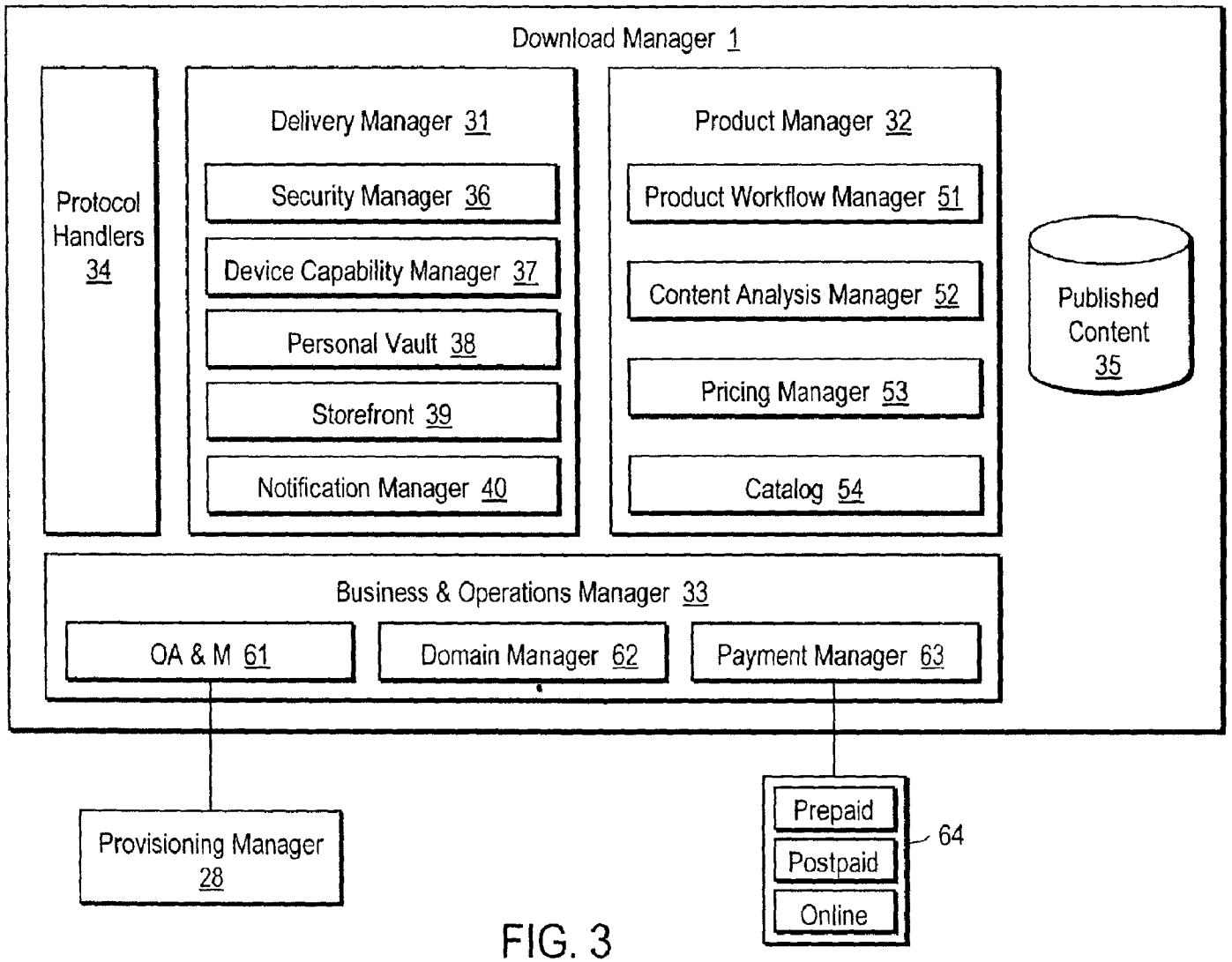
FIG. 3 schematically shows the components of the download manager.

FIG. 3 schematically shows the download manager in greater detail, according to certain embodiments of the invention. In the illustrated embodiment, the major components of the download manager include a delivery manager 31, a product manager 32, a business & operations manager 33, and multiple protocol handlers 34. Each of these components is preferably implemented as software, data, or a combination of software and data. However, in other embodiments, some or all of these components could be implemented in hardwired circuitry. The download manager 1 may also include a database 35 of published content, as shown, although at least some of the published content may instead be stored remotely.

The product manager 32 is the download manager's interface to the various content suppliers and provides centralized product cataloging (including enabling qualified content suppliers to register content for analysis and publication) and complete product life cycle support (i.e., management of content submission, analysis, approval, publication, use, maintenance, and eventual deactivation). The term "publication", as used herein, means making a product available on the download manager to wireless services subscribers for downloading to their client devices. The delivery manager 31 is the download manager's interface to the various subscribers and is responsible for delivering purchased digital content to subscribers, including invoking a protocol handler appropriate for communicating with each requesting mobile device. The protocol handlers 34 support multiple product discovery protocols and multiple product delivery protocols simultaneously. Hence, the protocol handlers 34 include product discovery handlers (e.g., a WAP handler, a Web handler, a Motorola Discovery handler) and product delivery handlers (e.g., a MIDP OTA handler, a Motorola OTA handler, a Nokia COD OTA handler). The business & operations manager 33 is mainly responsible for managing domain information and processes for charging subscribers for purchases of content. These components are described further below.

As shown in FIG. 3, the delivery manager 31 in certain embodiments includes a security manager 36, a device capability manager 37, a personal vault 38, a storefront 39, and a notification manager 40. The storefront 39 is a conventional graphical user interface for allowing subscribers to make online purchases. It can be branded to a particular wireless carrier, for example, or other business entity. The security manager 36 is responsible for authentication of subscribers and client devices for purposes of purchasing content and preferably can support multiple authentication schemes, such as HTTP-based authentication, MSISDN/NIA based authentication, etc. The personal vault 38 stores, on a subscriber-by-subscriber basis, information to facilitate digital rights management (DRM), such as product licenses and/or other "purchase" information of the products purchased by each subscriber. This allows a subscriber to remove downloaded content from a mobile device without losing rights to the product, or to recover products on a device in cases of device hard reset, loss, etc.

The notification manager 40 can provide various types of notifications to subscribers using various communication channels, such as email, SMS, and WAP Push. The notification manager 40 can generate notifications automatically, such as notifications of new products or product upgrades, or in response to commands from a system administrator, such as account notifications, notifications of special promotions, etc.

The device capability manager 37 is responsible for device recognition (e.g., supporting device recognition through UAProf using Profile headers and Profile-Diff headers), device capability determination (e.g., retrieving device descriptors using best efforts and appending device capabilities to the session context), and device capability management (e.g., automated management of UAProf capable devices and quarantine of undefined or partially defined devices). As described further below, recognition of devices and their capabilities is used for a variety of purposes, such as to filter the set of available products that a subscriber can discover when connecting to the download manager 1, to select the appropriate implementations of products that are purchased, and to select the appropriate provisioning model for provisioning a purchased product in a client device.

Figure 4:
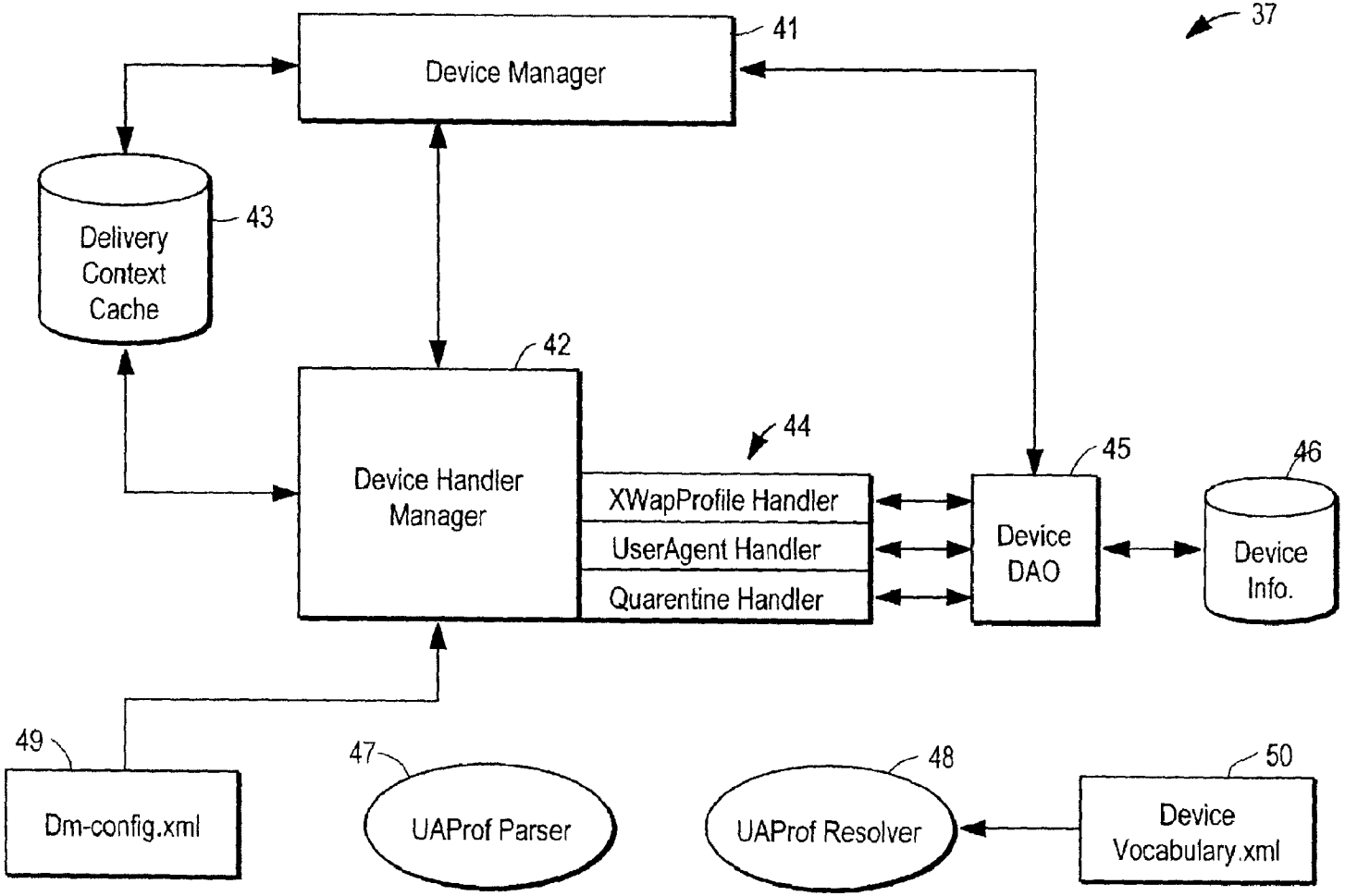
FIG. 4 shows the components of the device capability manager.

FIG. 4 shows the components of the device capability manager 37 according to an embodiment of the invention. The device capability manager 37 includes a device manager 41, a device handler manager 42, a delivery context cache 43, a set of device recognition handlers 44, a device data access object (DAO) 45, a device information database 46, a UAProf parser 47, a UAProf resolver 48, a dm-config.xml file 49, and a DeviceVocabulary file 50. The device information database 46 stores information identifying mobile devices and their corresponding capabilities. The device manager 41 contains all of the business logic that supports the user interface and the rest of the download manager 1. The device DAO 45 contains all data logic and scripted query language necessary to communicate with the device information database 46.

The device handler manager 42 is responsible for discovering and determining the types of devices accessing the download manager 1. Upon startup of the download manager 1, the device handler manager 42 loads the device recognition handlers 44 ordered by the dm-config.xml file 49. This order is then used to determine which headers are to be processed first. The delivery context cache 43 is used to help improve performance on subsequent look-ups. If no device capabilities can be found or processed by the chain of handlers 44, the device handler manager 42 then uses a default delivery context as defined by an administrative user interface.

The illustrated embodiment includes three device recognition handlers 44: an XwapProfile handler, a UserAgent handler, and a quarantine handler. The XwapProfile handler is responsible for processing the "x-wap-profile" and "x-wap-profil-diff" request headers in requests from mobile (client) devices. It makes use of the UAProf parser 47 to parse RDF-compliant files and the UAProf resolver 48 to resolve the differences of the headers. The UAProf parser 47 parses RDF-compliant files. The UAProf resolver 48 reads resolution rules from the device-vocabulary.xml configuration file 50 and uses these rules to help merge x-wap-profile and x-wap-profile-diff headers.

The UserAgent handler is responsible for processing the "user-agent" request headers. It uses regular expression matching to best match the capabilities with the incoming "user-agent" header. If no user-agent header can be found or one is found but does not match to any existing capabilities, the request header is passed to the next handler in the chain.

The quarantine handler is responsible for processing any "accept" request headers. If the quarantine handler finds a user-agent header, it will add a new record in a device match table. Otherwise, it will simply return a delivery context with a set of capabilities determined by the "accept" headers and capabilities already defined by the default device profile.

The device capability manager 37 is capable of managing client devices in either of two categories: actual devices and generic devices. In response to client device requests, the device capability manager 37 uses actual device information from the request and any applicable stored generic device definitions to recognize the accessing client device and its capabilities. The system administrator can define devices (or device capabilities) in either category. An actual device is a particular make and model of client device, such as "Nokia 6310". Actual devices are identified solely from incoming requests, based on the UserAgent and x-wap-profile headers in the requests, for example. A generic device is a predefined device or set of device capabilities. Examples of some generic device definitions are: all Nokia devices (e.g., "vendorname=nokia"), all devices with display size >40, and all devices which support SMS. In response to client device requests, the device capability manager 37 uses the UserAgent or x-wap-profile header to identify the actual device accessing the system and to look up its corresponding capabilities in the device information database 46, which are combined with any applicable generic device definitions to determine the capabilities of the client device. The use of this information is described further below.

It is useful now to define two types of device capabilities which the device capability manager is able to resolve: static capabilities and active capabilities. As defined in the download manager, "static" capabilities are the well-known set of attributes for a given device which are defined during preprocessing, not on-the-fly. These are associated with a client device as identified in the UserAgent or x-wap-profile headers. Generic devices, as defined above, only have static capabilities. "Active" capabilities represent a dynamic collection of attributes extracted during an interaction between the client device and the download manager, typically from the Accept headers. These two types of device capabilities are stored separately in the device information database 46.

The ability for a user to discover content based on the static (well-known) capabilities of his device is valuable. With the number of device manufacturers and content providers in the market, there is often a gap between the interoperability of a given content and how effective it can be run on a device. By using the system's unique ability to capture the capabilities of a device and for content suppliers to select compatible devices for their content, the download manager 1 is capable of targeting supported products to their respective devices for a subscriber. In addition, the download manager 1 is able to easily adapt to the ever-changing modifications to capabilities and requirements and is highly scalable as more devices and content are pushed into the system, without a substantial decrease in performance.

Referring again to FIG. 3, the product manager 32 in certain embodiments includes a product workflow manager 51, a content analysis manager 52, a pricing manager 53, and a product catalog 54. The product workflow manager 51 allows the system administrator to define and modify details of the product workflow for processing content submitted by content providers. An example of a product workflow is (n chronological order): 1) submission, 2) content analysis, 3) listing of content in the product catalog, 4) usage of the content, 5) maintenance of content, and 6) content retirement (i.e., cancellation or deletion).

The content analysis manager 52 manages the process of verifying content quality and compliance with various requirements when the content is initially submitted by the content supplier (e.g., compliance with its declared type, content structure resource utilization, etc.). Content must pass the content analysis process satisfactorily before being listed in the product catalog 54 (i.e., published).

The pricing manager 53 allows administrators to add, modify and delete license for products in the store. The pricing manager 53 also includes and invokes a set of rating handlers at the time of purchase, which can adjust the price of the product based on various factors (e.g., promotions, applicable rebates, etc.), as described further below.

Figure 5:
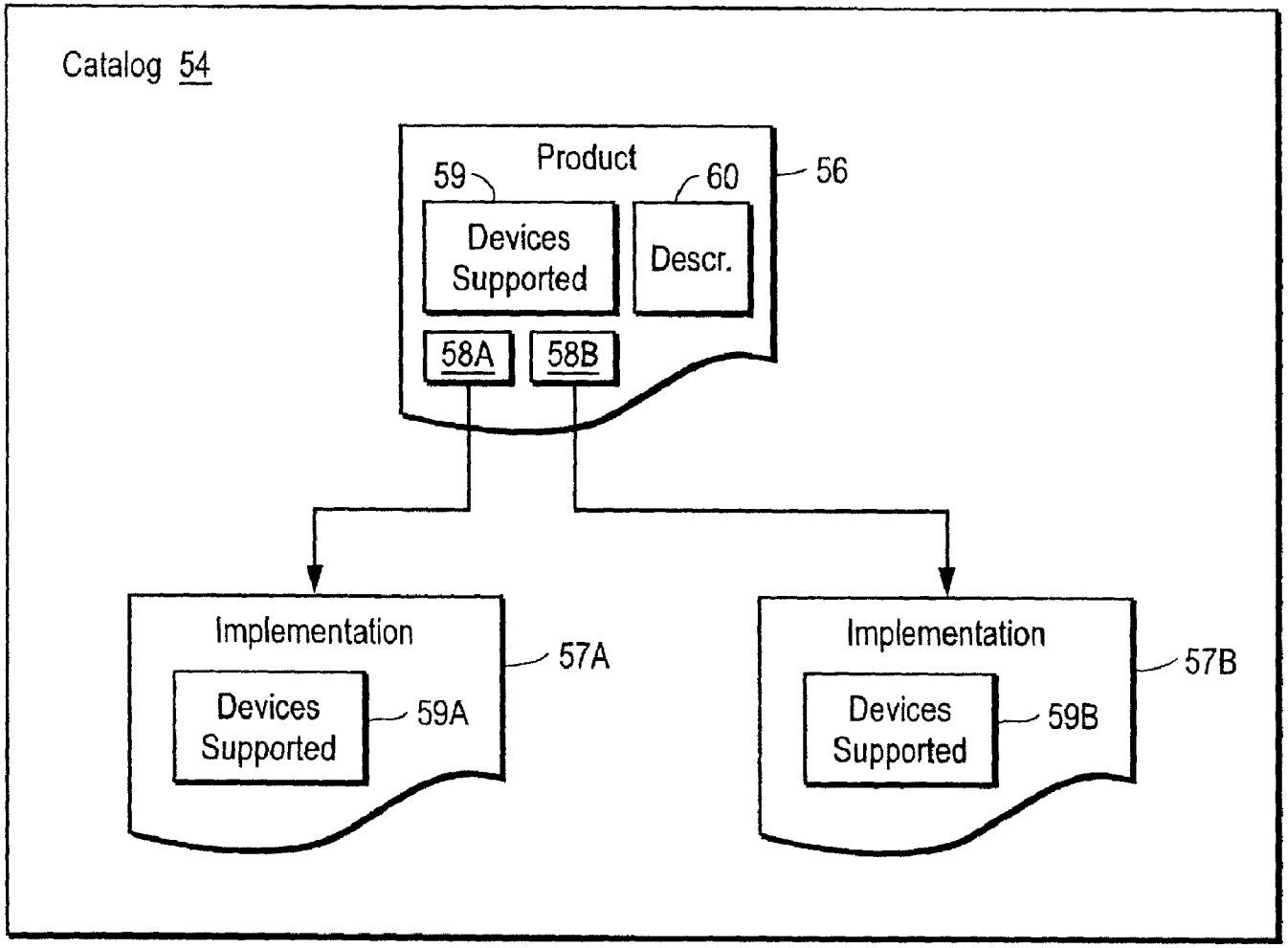
FIG. 5 shows the relationship between a product entry and implementations of the product in the product catalog.
Figure 6:
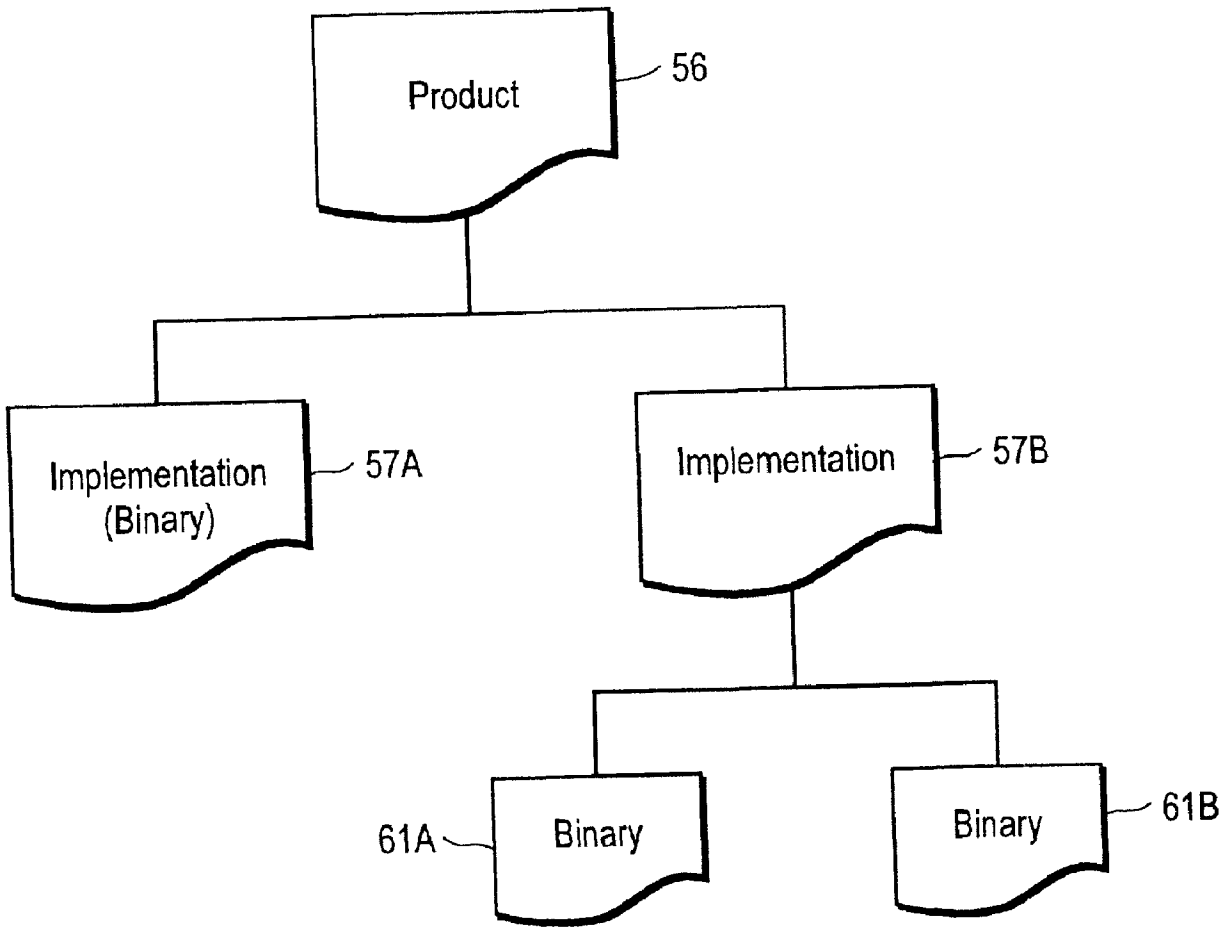
FIG. 6 shows the relationship between a product and its implementations.

The product catalog 54 contains descriptions of all published items of content (products). Referring to FIG. 5, the catalog 54 includes, for each product entry 56, a reference 58 to at least one implementation 57 of that product. An implementation 57 can be simply a binary file (a "binary") representing the product. In some cases, however, an implementation 57 may represent two or more binaries 61, as shown in FIG. 6. Also as represented in FIG. 5 and FIG. 6, any particular product may have multiple implementations published on the download manager, each of which may be designed for a different specific client device or set of client devices.

Hence, any particular product entry in the catalog 54 can include references to multiple implementations of the product. However, the products shown to any particular subscriber when the subscriber views the catalog are filtered according to the device capabilities of the subscriber's device. More specifically, only those products that have at least one implementation compatible with the subscriber's device are shown to the subscriber. As shown in FIG. 5, each implementation entry 57 also includes a list (59A or 59B) of devices supported by that implementation. Each product entry 56 in the catalog 54 includes a list 59 of the devices that are supported by that product. Which represents the aggregation of all of the devices supported by all of the implementations 57 of that product.

In addition, for any particular product, the catalog may include a description 60 of the product in multiple different languages, to accommodate subscribers in different countries. Product descriptions 60 are shown to each subscriber in the appropriate language, and the prices of products are shown in the appropriate currency, according to the domain of which the subscriber is a member. The domain of the subscriber is identified by the domain manager 62, as described below.

Referring again to FIG. 3, the business & operations manager 33 in certain embodiments includes an operation administration and management (OA&M) module 61, a domain manager 62, and a payment manager 63. The OA&M module 61 provides a Web based user interface for administering the download manager 1. It supports role-based delegation of administration duties (e.g., system administrator, domain administrator, product administrator, customer care administrator, etc.) and interfaces with the provisioning manager to provide logging and reporting of key events and transactions.

The payment manager 63 is responsible for the process of charging subscribers when they purchase content and supports multiple different languages and currencies, partitioned by domain. The approach to billing and payment assumes that there are local billing mechanisms in place, each of which has an established relationship to the subscriber already. The local billing mechanism operates in the local currency using the local taxes, fees and other applicable charges for the subscriber's region. It also invoices at intervals that are customary for the region.

In certain embodiments of the invention, a subscriber can select the preferred payment model to use of three available payment models:

Online payment—payment is performed 'just-in-time'. A typical implementation performs the payment transaction at the time of the purchase.

Pre-paid payments—payment is performed before purchase and the purchase is deducted from the pre-paid amount.

Post payments—payment is performed after the purchase by invoice.

A separate payment handler of a set of payment handlers 64 is accessible to the payment manager 63 for each of these payment models (see FIG. 3), and the payment manager is responsible for invoking the appropriate payment handler 64 at the time of purchase.

Figure 7:
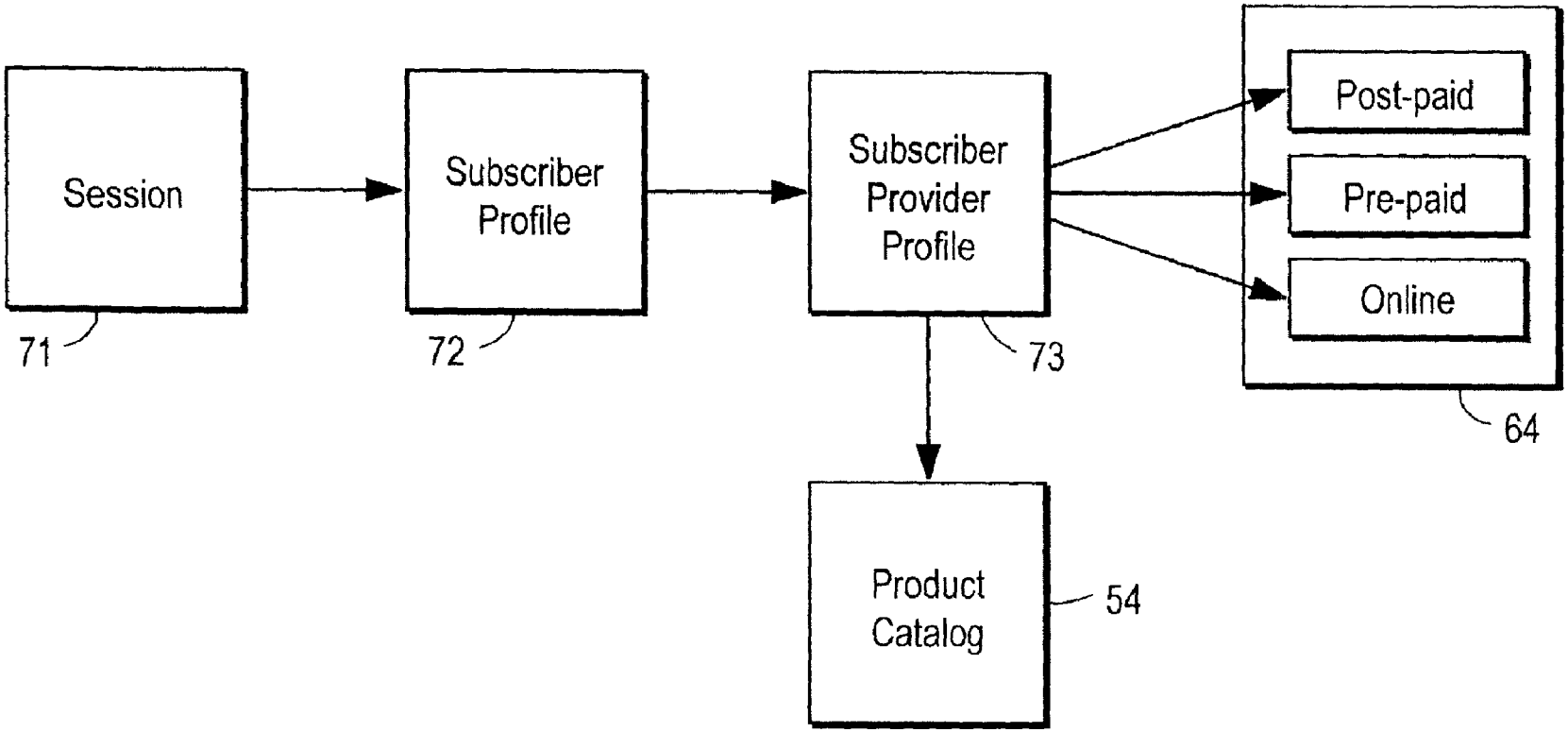
FIG. 7 shows how various data elements are used in the billing process.

Referring now to FIG. 7, anytime a subscriber logs in to the download manager, a session 71 is created. The session 71 holds a reference to a unique subscriber profile 72 associated with the subscriber. Each subscriber has such a subscriber profile, which points to the organization that holds the billing relationship with the subscriber (i.e., the partner responsible for invoicing the subscriber) and an indication of the subscriber's selected payment model (i.e., post-paid, pre-paid, or online).

The download manager 1 also maintains a subscriber provider profile 73 for each subscriber provider (e.g., wireless carrier, etc.). Each subscriber provider profile 73 holds a reference to each of the payment handlers 64, an indication of the local currency, and an indication of any value added tax and/or other charges that normally apply to the offered services in the region.

The product catalog 54, as described above, holds the name, description and price of each product, as well as information indicating the supported devices. There is a separate entry for each supported local currency. There are no dependencies between the prices in various currencies for the same product.

This approach allows a product (or service) to have many different prices, on in each supported currency. There are no dependencies between prices other than that they all apply to one product. This approach, therefore, supports localized pricing policies and local taxes, etc.

The payment manager 63 includes a set of rating handlers (not shown), which are responsible for adjusting the price of products based on various factors, such as promotional offers, applying rebates, etc. Prices of content may change from time to time, subject to factors such as rebates, promotions, etc. At the time of purchase, the price of the product is determined by invoking the rating handlers. Each rating handler is called by the payment manager 63 with a reference to the corresponding product license and a reference to the subscriber. The rating handler is responsible for adjusting the price, if appropriate, and returning a new price.

Each of the payment handlers includes a charge method. During purchase the charge method of the registered payment handler for the payment model selected by the subscriber is called. The argument to the charge method is a data structure, ChargeDetailRecord, generated by the payment manager 63, which holds information about the subscriber, the product, the product license with the price, and the domain of the subscriber. The charge method can either approve the charge and, thus, allow the purchase, or it can deny the purchase.

Referring again to FIG. 3, the domain manager 62 manages the associations between domains and partners, subscribers, suppliers, and products, and stores all of the domain information. As noted above, each domain can have the following properties:

- a name (localized)
- a description (localized)
- a uniform resource locator (URL) to a web site giving further description of the domain
- a contact address including contact person, contact telephone numbers, fax numbers and postal address
- the currency to use for billing and display purposes
- reference to handlers for online payment, pre-payment and post-payment
- a set of references to rating handlers The domain manager 62 enables flexible business models to be implemented via revenue sharing between, and charging by, different stakeholders (partners).

Figure 8:
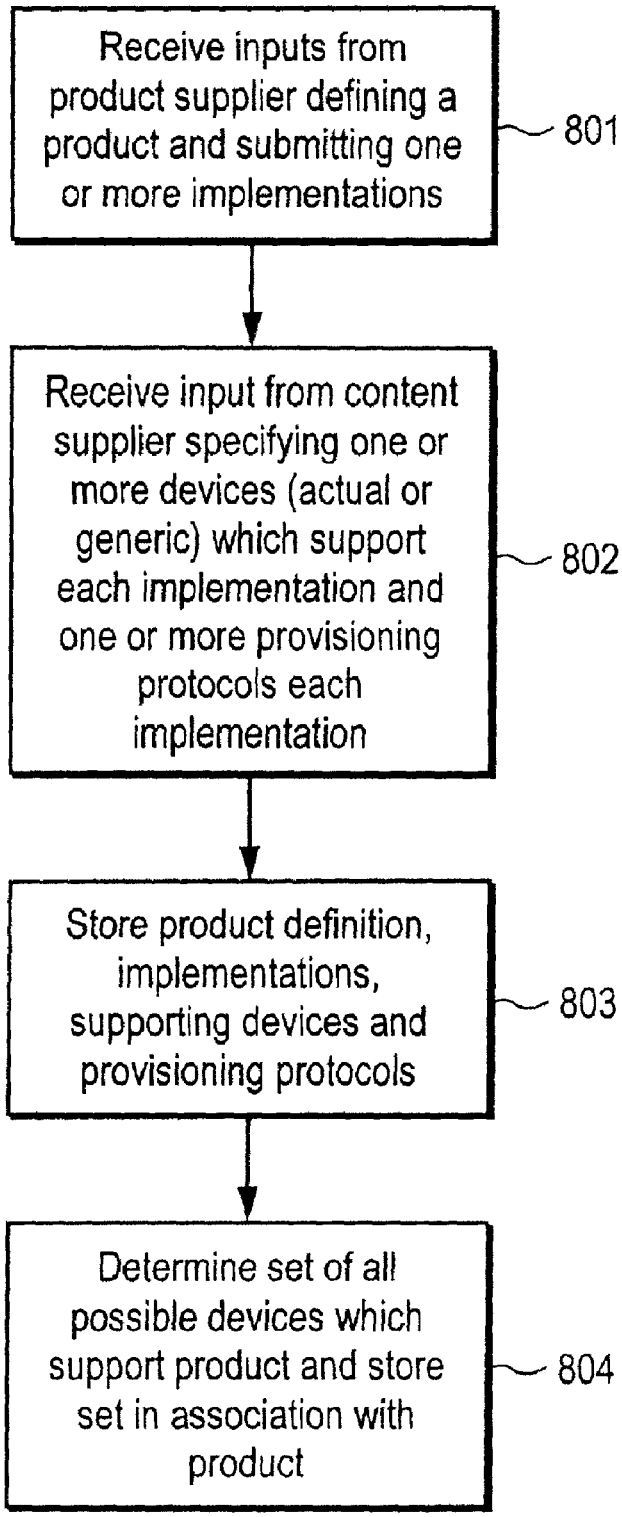
FIG. 8 illustrates a simplified process by which a product can be listed in the product catalog in a way that facilitates device-tailored product discovery and provisioning.

Various aspects of the operation of the download manager 1 will now be described further with reference to FIGS. 8 through 13. FIG. 8 illustrates a simplified process by which a product can be listed in the product catalog in a way that facilitates device-tailored product discovery and provisioning, according to an embodiment of the invention. Certain operations in the product workflow are not shown in FIG. 8 to facilitate explanation, such as content analysis and approval. Initially, at block 801 the download manager 1 receives inputs from a product supplier defining a product and one or more implementations of that product. At block 802, the download manager receives inputs from the supplier specifying one or more devices (actual or generic) which support each implementation and one or more provisioning protocols to be used for each implementation. At block 803 the download manager 1 stores the product definition, the implementations, and a list of all of the supported devices and provisioning protocols. Finally, at block 804 the download manager 1 determines the set of all possible devices which support the product and stores this information in association with the product information in the product catalog 54.

Figure 9:
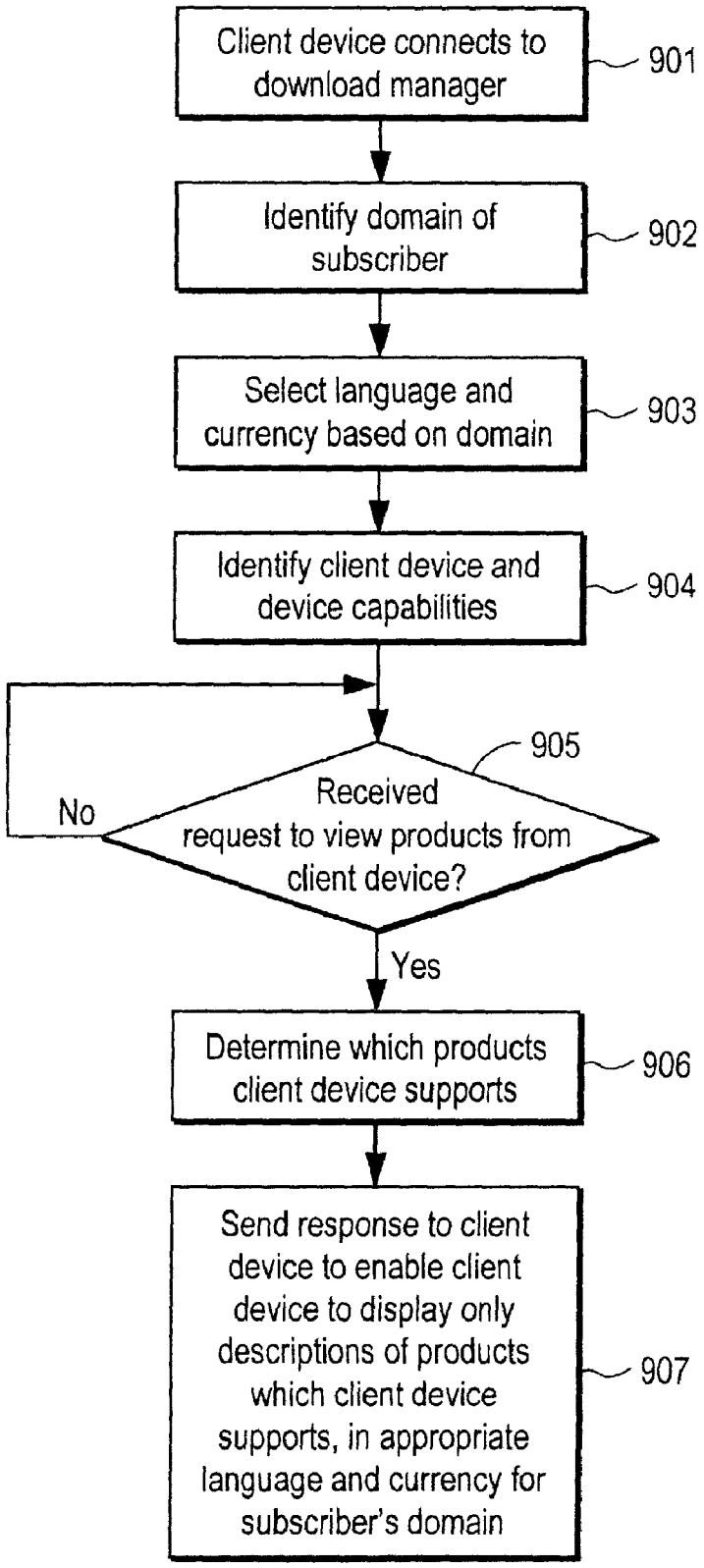
FIG. 9 shows a process by which the product catalog is displayed to a subscriber.

FIG. 9 shows a process by which the catalog is displayed to a subscriber, according to an embodiment of the invention. At block 901 a client device operated by the subscriber connects to the download manager 1. The domain manager 62 then identifies the domain of the subscriber at bock 902 based on its stored domain and subscriber associations. At block 903, the product manager 32 selects the language and currency to be used based on the domain of the subscriber (each domain has one language and currency). At block 904, the device capability manager 37 identifies the client device (e.g., from the UserAgent or x-wap-profile header) and its corresponding set of static (well-known) device capabilities. When a request to view available products is received from the client device (block 905), at block 906 the product manager 32 determines from the product catalog 54 which products are supported by the client device, based on the (static) capabilities of the client device. The download manager 1 then sends a response to the client at block 907, to cause the client device to display product information relating to only those products supported by the client device, in the appropriate currency and language for the subscriber's domain.

Figure 10:
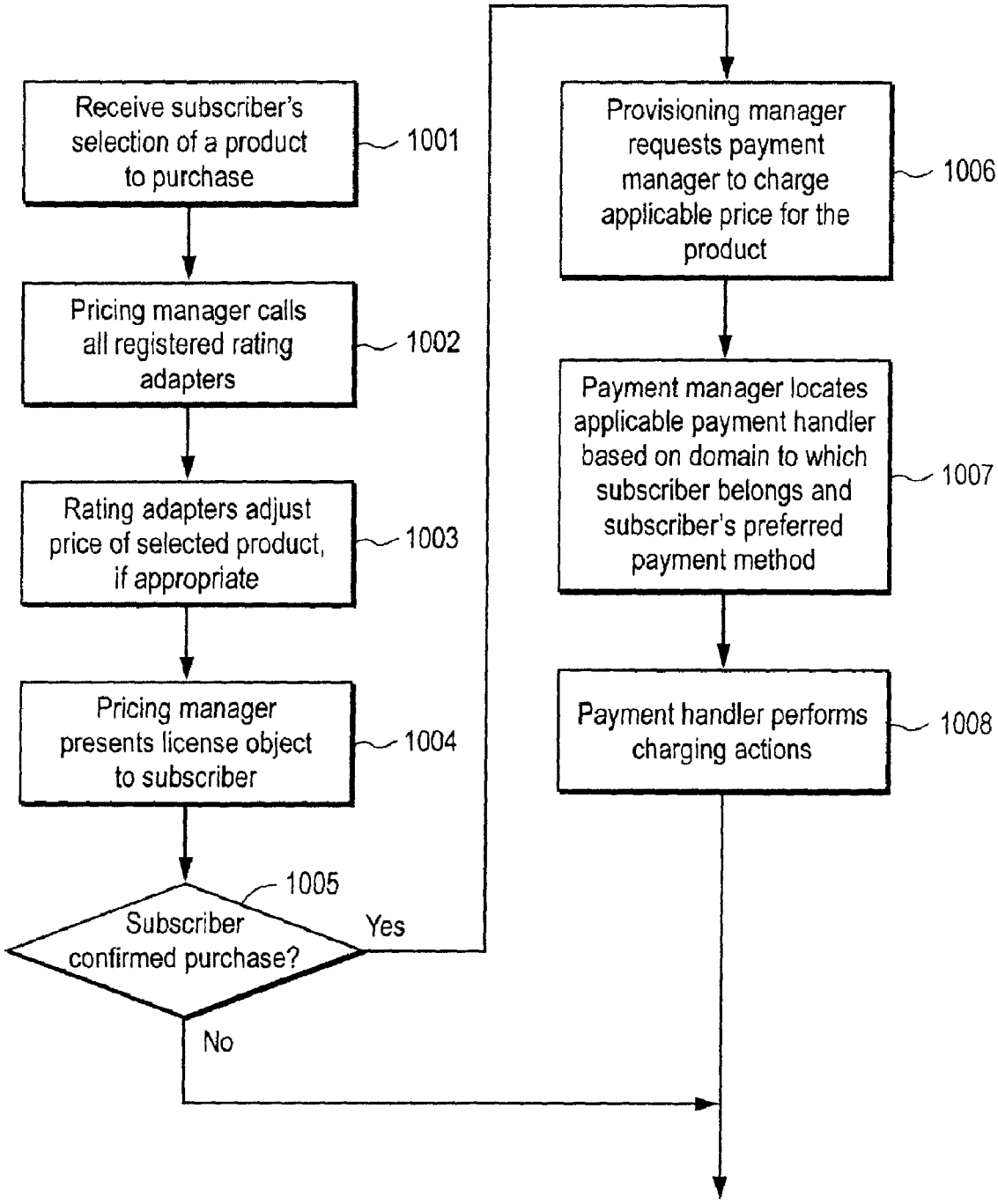
FIG. 10 shows a process by which a purchase of a product can be made using the download manager.
Figure 11:
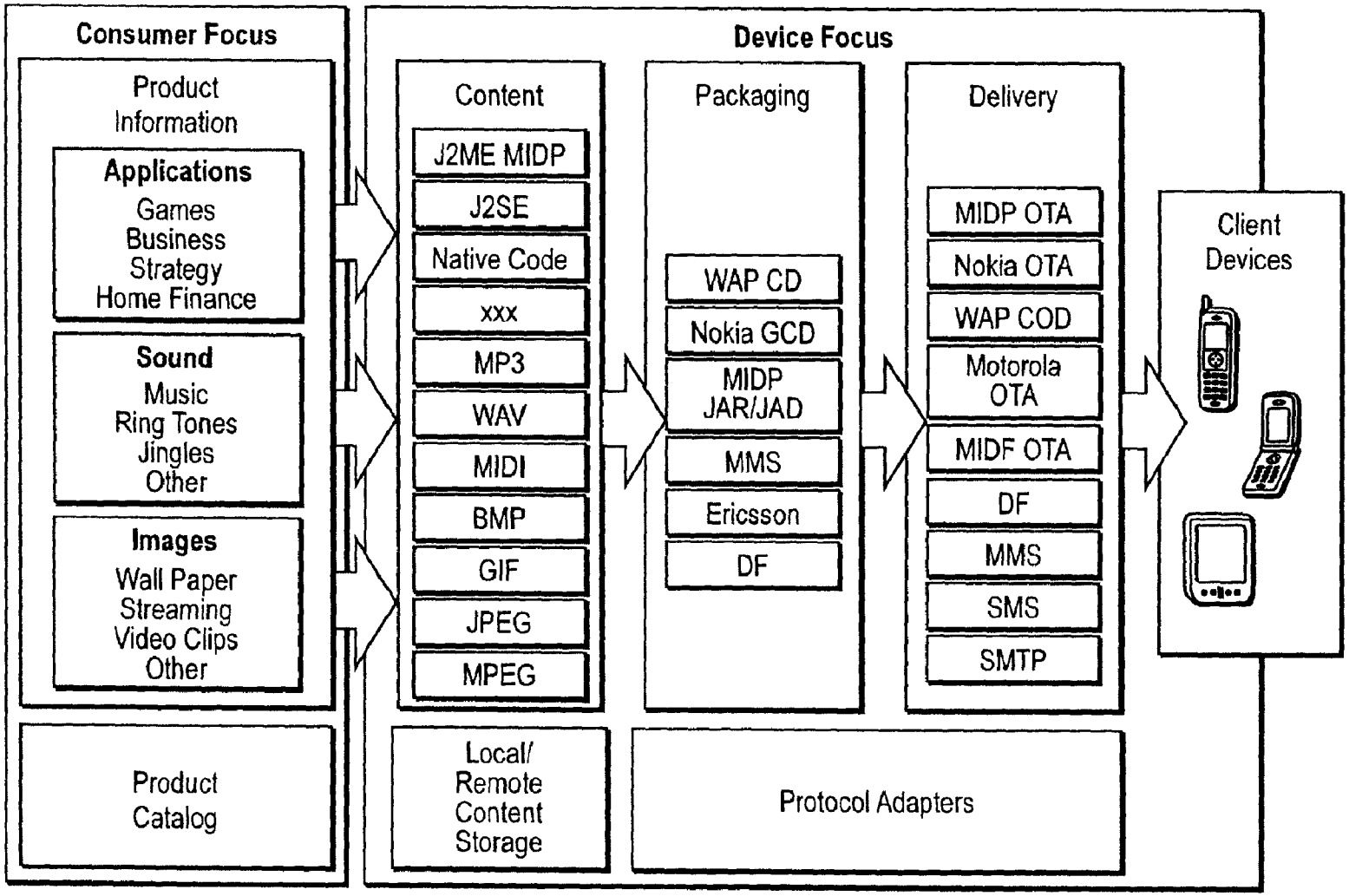
FIG. 11 illustrates the separation, within the download manager, of content from how the content is provisioned.

FIG. 10 shows a process by which a purchase of a product can be made, according to an embodiment of the invention. After displaying the product catalog 54 to the subscriber, the download manager 1 receives the subscriber's selection of the product to purchase at block 1001. At block 1002 the pricing manager 53 calls all of the registered rating adapters. The rating adapters then adjust the price of the selected product, if appropriate, at block 1003. At block 1004 the pricing manager 53 then presents a license object indicating the price to the subscriber. If the subscriber confirms the purchase (block 1005), then at block 1006 the provisioning manager requests the payment manager 63 to charge the applicable price for the product. The payment manager 63 responds at block 1007 by selecting the applicable payment handler 44 based on the domain to which the subscriber belongs and the subscriber's preferred payment model (pre-paid, post-paid, or online). Finally, at block 1008 the selected payment handler 44 performs the charge method to complete the transaction.

Multiple Provisioning Models

Different client devices often require different content provisioning protocols and packaging formats. In order to make a given item of digital content available to multiple mobile devices supporting different provisioning models, a digital content supplier would normally have to deploy that item of content multiple times, packaging it differently for each of the provisioning models. The download manager 1, however, separates content from how it is provisioned to a device. As described above and as illustrated conceptually in FIG. 11, in the download manager 1 the product information is separated from the content itself, the content is separated from how it is packaged for delivery, the packaged content is separated from the delivery mechanism, and the delivery mechanism is separated from the discovery mechanism (the mechanism by which the subscriber discovers a product). By virtue of this separation, a content supplier is able to deploy content only once, targeting a wide range of devices, and the download manager 1 will deliver the content to those devices over a wide range of provisioning protocols.

When a product is submitted to the download manager 1 by a supplier, the supplier specifies which devices are supported by each implementation of the product. This information is then stored by the download manager 1 and used to select the proper packaging and provisioning protocol when the product is subsequently purchased.

The provisioning model used to provision a particular product in a particular client device is based on the device capabilities of the client device as well as the content type of the best-fit implementation. A provisioning "model", in this context, includes a particular provisioning protocol and a content packaging format. The ability to deliver the "best-fit" content based on "active" (dynamic) capabilities of a device is advantageous. Content provisioning provides the second part of targeting products to a given subscriber based on his device's capabilities. Whereas product discovery as described above relies on the "static" capabilities, provisioning relies on the "active" capabilities to determine the exact and often new enhancements of the client device. Given that a device can be fitted or enhanced with new features not described by the default set of capabilities originally intended for the device, the download manager 1 can use these active capabilities to find the best match content to provision to the device.

Figure 12:
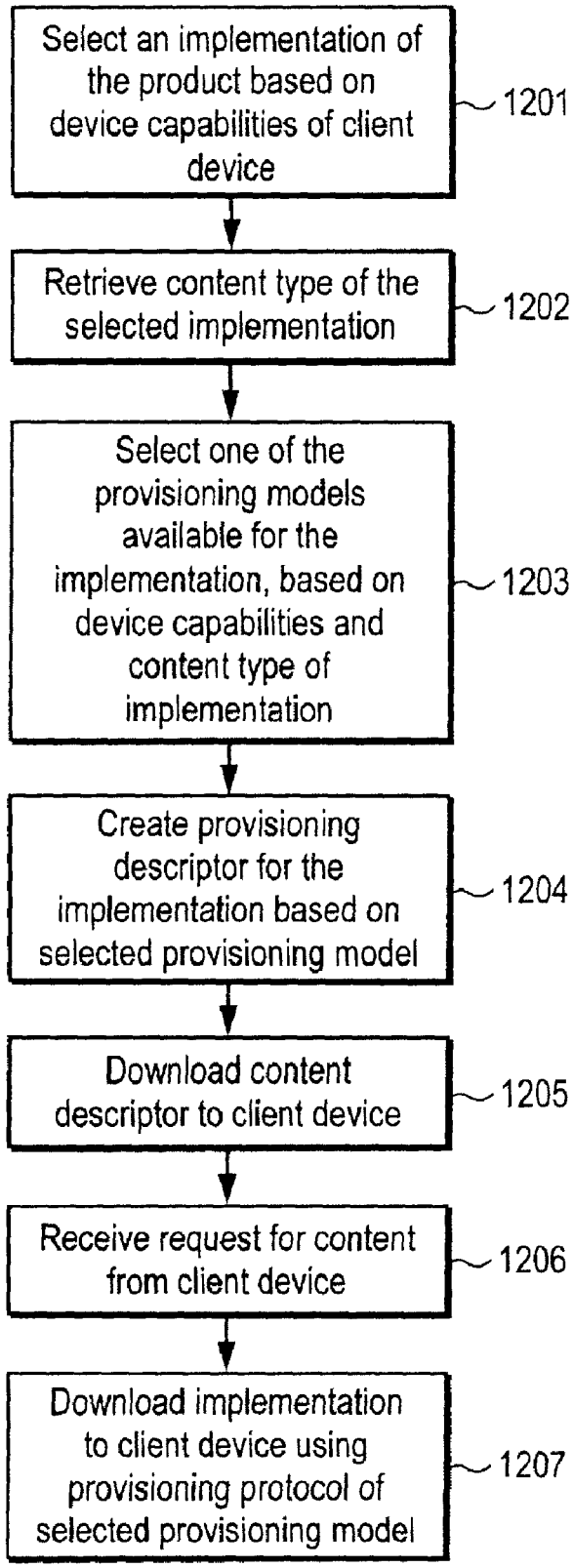
FIG. 12 illustrates a process by which a product is provisioned in a client device using the appropriate one of various provisioning protocols.

FIG. 12 illustrates a process by which a product is provisioned in a client device using the appropriate one of various provisioning protocols. At block 1201, in response to a subscriber purchasing a product, the delivery manager 31 selects the best implementation of the product based on the device capabilities (static and active) of the client device. At block 1202 the download manager retrieves the content type of the selected implementation (e.g., MIDlet, EXE file, applet, iAppli, etc.). At block 1203 the download manager 1 selects the appropriate provisioning model available for that implementation, based on the device capabilities of the client device and the content type of the selected implementation. The provisioning manager 28 then creates a content descriptor for the implementation at block 1204, based on the selected provisioning model. The content descriptor specifies the name of the content to be provisioned, the size of the content, a location (e.g., a URL) at which the content is stored, and the content type of the content. The content descriptor is unique to the provisioning handler (protocol) of the selected provisioning model.

The provisioning manager 28 then downloads the content descriptor to the client device at block 1205. The client device parses the descriptor and then requests the content. When the provisioning manager 28 receives the request for the content from the client device at block 1206, the provisioning manager 28 responds at block 1207 by downloading the content using the provisioning protocol of the selected provisioning model (e.g., COD OTA, Openwave Download Fun, MIDP OTA, etc.)

Download Manager Deployment Architecture

Figure 13:
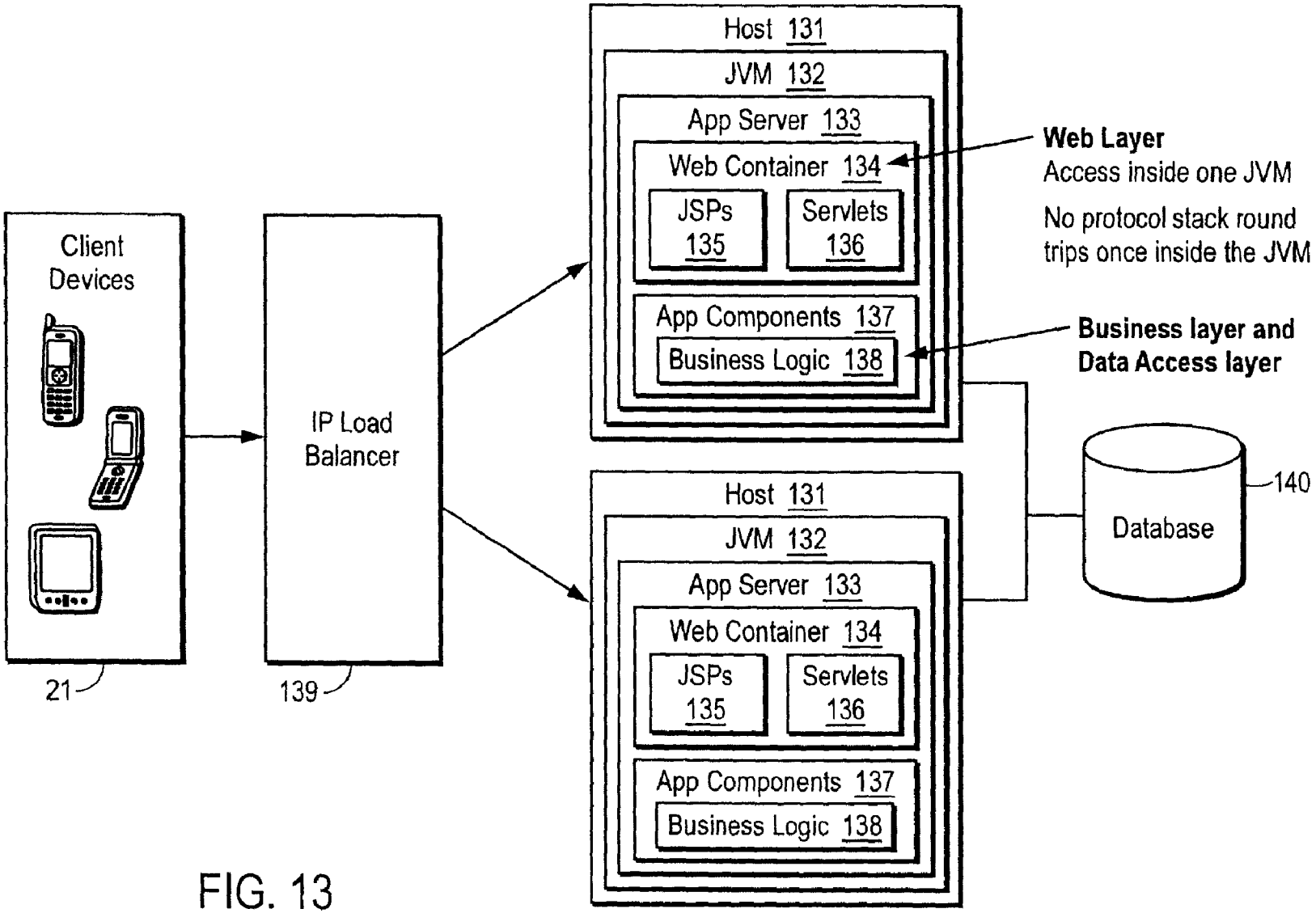
FIG. 13 shows an example of the software deployment architecture of the download manager.

FIG. 13 shows an example of the software deployment architecture of the download manager 1 at a high level, according to an embodiment of the invention. Each instance of the download manager 1 resides on a host 131 that has access to a database 140. The host 131 is a server-class computer system including an operating system (e.g., Solaris). The database 140 may represent multiple physical databases, which in aggregate store all of the data used by the download manager 1 (i.e., product information, subscriber information, partner information, domain information, etc.). In the illustrated embodiment, each host 131 includes a Java Virtual Machine (JVM) 132 which runs on top of the operating system and which hosts an application server 133. On top of the application server 133 is a Web container 134 that contains Java Server Pages (JSPs) 135 and servlets 136 as well as application components 137 including the business logic and data access layer 138 of the download manager 1.

The download manager 1 is formed by the Web container 134 and its contents, the application components 137, and at least a portion of the database 140. Horizontal scaling can be achieved by adding more hosts 131 hosting instances of the download manager 1. In that case, an Internet Protocol (IP) load balancer 139 provides sticky load balancing, i.e., directing all session-specific traffic to the same host.

Figure 14:
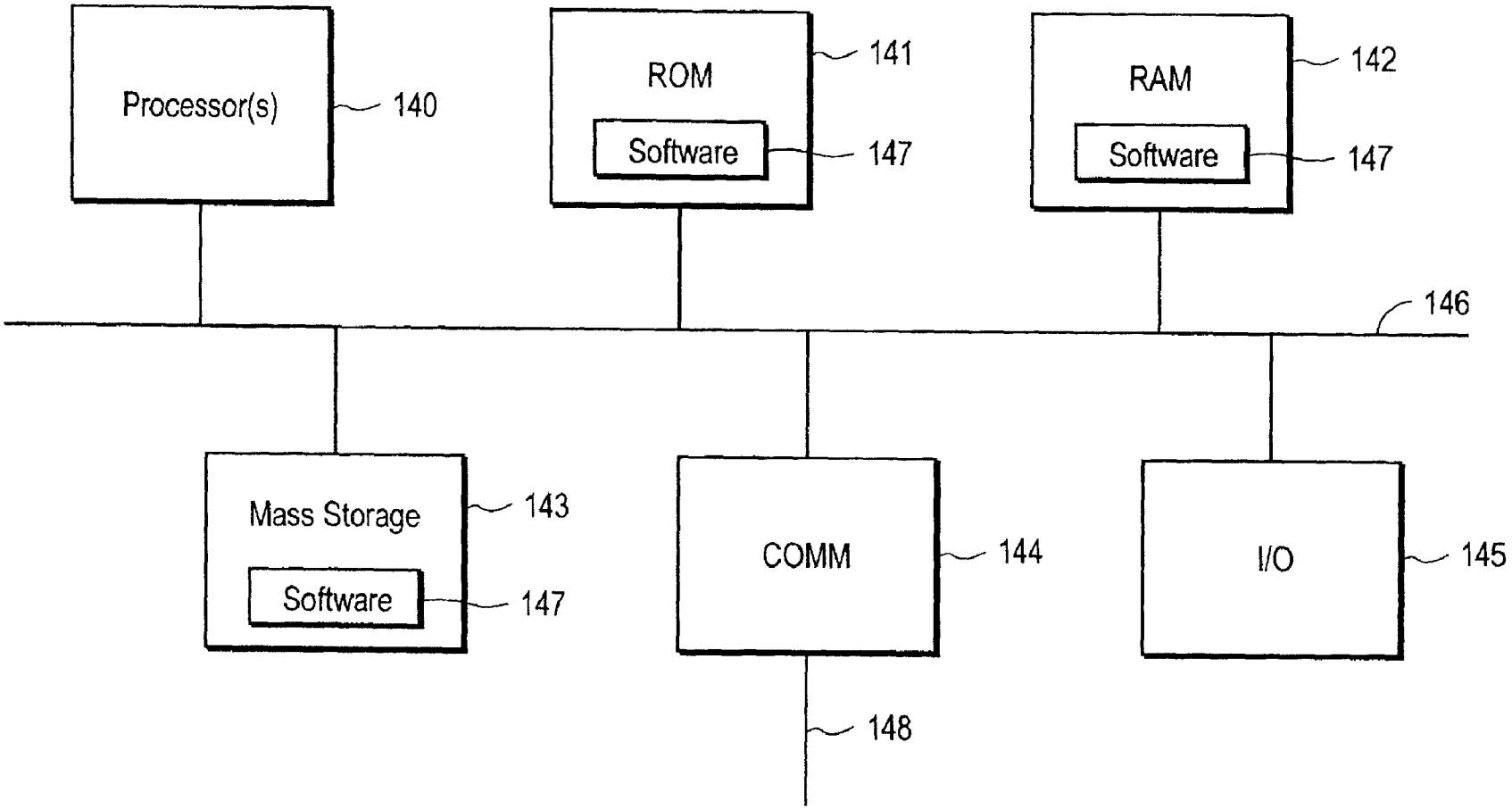
FIG. 14 illustrates the hardware architecture of a computer system in which the download manager can be implemented.

The above-described software architecture (i.e., the download manager) can be implemented in one or more conventional server-class computer systems. FIG. 14 illustrates the hardware architecture of such a computer system at a high-level. Note that this architecture is also representative of at least some client devices that access the download manager 1. Note also that FIG. 14 is a conceptual representation which represents any of numerous possible specific physical arrangements of hardware components; however, the details of such arrangements are not germane to the present invention and are well within the knowledge of those skilled in the art.

The processing system shown in FIG. 14 includes one or more processors 140, i.e. a central processing unit (CPU), read-only memory (ROM) 141, and random access memory (RAM) 142, each connected to a bus system 146. Also coupled to the bus system 146 are a mass storage device 143, a data communication device 144, and in some embodiments, one or more additional input/output (I/O) devices 145.

The processor(s) 140 may be, or may include, one or more programmable general-purpose or special-purpose microprocessors or digital signal processors (DSPs), microcontrollers, application specific integrated circuits (ASICs), programmable logic devices (PLDs), or a combination of such devices. The bus system 146 includes one or more buses or other physical connections, which may be connected to each other through various bridges, bus controllers and/or adapters such as are well-known in the art. For example, the bus system 146 may include a "system bus", which may be connected through one or more adapters to one or more expansion buses, such as a Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire"). In alternative embodiments, some or all of the aforementioned components may be connected to each other directly, rather than through a bus system.

The mass storage device 143 may be, or may include, any one or more devices suitable for storing large volumes of data in a non-volatile manner, such as a magnetic disk or tape, magneto-optical (MO) storage device, or any of various types of Digital Versatile Disk (DVD) or Compact Disk (CD) based storage, or a combination of such devices.

The data communication device 144 is a device suitable for enabling the processing system to communicate data with a remote processing system over a data communication link 148, and may be, for example, a conventional telephone modem, a wireless modem, an Integrated Services Digital Network (ISDN) adapter, a Digital Subscriber Line (DSL) modem, a cable modem, a radio transceiver, a satellite transceiver, an Ethernet adapter, or the like.

The I/O devices 145 (which may be omitted in a system that operates exclusively as a server and provides no direct local user interface) may include, for example, one or more devices such as: a pointing device such as a mouse, trackball, touchpad, or the like; a keyboard; audio speakers; and/or a display device such as a cathode ray tube (CRT), a liquid crystal display (LCD), or the like. Other variations upon the illustrated set of components can be implemented in a manner consistent with the invention.

Software (including instructions and data) 147 to implement the techniques described above may be stored in one or more of ROM 141, RAM 142, and mass storage device 143. In certain embodiments, the software 147 may be initially loaded into the processing system by downloading it from a remote system through the communication device 144.

Thus, a system and method for managing the publication, purchase and delivery of digital content from multiple content suppliers to multiple wireless services subscribers in multiple domains have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of providing access to digital products for use in wireless communication devices, the method comprising:

operating a server system to store domain data defining a plurality of domains, each domain corresponding to a different subset of a plurality of wireless services subscribers, each said subset of the plurality of wireless services subscribers including more than one wireless services subscriber, each of the domains further corresponding to a particular billing relationship between a business entity and the corresponding subset of the plurality of wireless services subscribers, each of the domains having assigned thereto to a particular set of digital products designed for use in wireless communication devices that are accessible to the wireless services subscribers in that domain;

operating the server system to enable a plurality of digital products suppliers to publish on the server system digital products designed for use in wireless communication devices via a computer network such that the digital products are accessible to the plurality of wireless services subscribers; and operating the server system to enable wireless services subscribers in each of the plurality of domains to acquire the digital products via at least one wireless network and to use the acquired digital products on associated wireless communication devices.

2. A method as recited in claim 1, wherein the plurality of domains further correspond to a delegation of administrative responsibilities for the digital products and the subscribers.

3. A method as recited in claim 2, wherein:

each of the subscribers is a member of exactly one of the domains.

4. A method as recited in claim 1, wherein each of the domains has an associated currency for use in presenting digital products to the subscribers and for billing the subscribers for digital products, where the currency of each domain can be set independently of the currency of every other domain, the currency of each domain being indicated in the server system by the domain data corresponding to each said domain.

5. A method as recited in claim 1, wherein each of the domains has an associated language for use in communicating with the subscribers belonging to the domain, where the language of each domain being can be set independently of the language of every other domain, the language of each domain being indicated in the server system by the domain data corresponding to each said domain.

6. A method as recited in claim 1, further comprising operating the server system to enable the digital products suppliers to manage their respective digital products stored on the server system via the computer network.

7. A method as recited in claim 1, further comprising determining a price for each of the items of digital products, where the price of each of the items of digital products can be set independently for each of the plurality of domains.

8. A method as recited in claim 1, further comprising:

receiving a request from one of the subscribers to access digital products; identifying the domain in which the subscriber is included in response to the request; determining a language which corresponds to the domain in which the subscriber is included; causing a product catalog including descriptions of available digital products to be presented to the subscriber in said language, based on the domain in which the subscriber is included; receiving a selection from the subscriber of an item of digital products in the product catalog; determining a price and a currency for the selected item based on the domain in which the subscriber is included; and causing the price to be presented to the subscriber in terms of said currency.

9. A method as recited in claim 1, the plurality of domains further being defined such that each of the subscribers is able to view descriptions of digital products for a domain with which the subscriber is associated but is not able to view descriptions of digital products of any domain with which the subscribers is not associated.

10. A method comprising:

maintaining, in a server system, data defining a plurality of domains, each domain corresponding to a different subset of a plurality of wireless services subscribers, each said subset including more than one wireless services subscriber, each of the domains corresponding to a particular billing relationship between a business entity and the corresponding subset of a plurality of wireless services subscribers, including specifying for each of the domains a language for purposes of allowing wireless services subscribers to identify and obtain digital products, where the language for each domain can be set independently of the language of every other domain, and further including specifying for each of the domains a currency in which digital products is to be expressed to wireless subscribers for purposes of wireless services subscribers obtaining digital products, where the currency for each domain can be set independently of the currency of every other domain;

enabling a plurality of digital product providers to publish the digital products on the server system;

enabling each of the subscribers to view descriptions of at least some of the digital products and to request the digital products from the server system, such that each of the subscribers is able to view descriptions of digital products for a domain with which the subscriber is associated but is not able to view descriptions of digital products of any domain with which the subscriber is not associated; and provisioning the requested digital products in wireless communications devices of the subscribers via at least one wireless network.

11. A method as recited in claim 10, wherein said maintaining data defining a plurality of domains comprises maintaining, in the server system, data defining an association between each of the subscribers and one of the domains.

12. A method as recited in claim 11, further comprising executing a payment process to charge the subscribers for said provisioning.

13. A method as recited in claim 10, further comprising maintaining a product catalog containing descriptions of the digital products.

14. A method as recited in claim 10, further comprising enabling the digital product suppliers to manage digital products which they have caused to be published on the server system.

15. A method as recited in claim 10, further comprising determining a price for at least one of the digital products independently for each of the plurality domains.

16. A method as recited in claim 10, further comprising:

receiving a request from one of the subscribers to access digital products;

identifying the domain of which the subscribers is a member in response to the request;

determining a language which corresponds to the domain of which the subscriber is a member;

causing a product catalog including descriptions of available digital products to be presented to the subscriber in said language;

receiving a selection from the subscriber of a digital product included in the product catalog;

determining a price and a currency for the selected digital product based on the domain of which the subscriber is a member; and causing the price to be presented to the subscriber in terms of said currency.

17. A system comprising:

means for maintaining an association between each of a plurality of subscribers of wireless services and one of a plurality of domains into which the plurality of subscribers are grouped, each domain corresponding to a group of the wireless services subscribers and including a different subset of the plurality of subscribers, each said subset of the plurality of wireless services subscribers including more than one wireless services subscriber, each of the domains further corresponding to a particular billing relationship between a business entity and the corresponding subset of the plurality of wireless services subscribers, each of the domains having assigned thereto a particular set of digital products designed for use in wireless communication devices that are accessible to the wireless services subscribers in that domain; and means for managing publication, management and delivery of digital products by a plurality of digital products suppliers to the subscribers in each of the plurality of domains.

18. A system as recited in claim 17, the plurality of domains further being defined such that each of the subscribers is able to view descriptions of digital products for a domain with which the subscriber is associated but is not able to view descriptions of digital products of any domain with which the subscriber is not associated.

19. A system as recited in claim 17, further comprising:

means for specifying for each of the domains a language for purposes of allowing wireless services subscribers to identify and obtain digital products, where the language for each domain can be set independently of the language of every other domain; and means for specifying for each of the domains a currency in which content is to be expressed to wireless subscribers for purposes of wireless services subscribers obtaining digital products, where the currency for each domain can be set independently of the currency of every other domain.

20. A system to provide digital products from a plurality of digital products suppliers to a plurality of wireless services subscribers using a plurality of wireless communications devices, the system comprising:

*memory for storing instructions and data; and*

*one or more processors for processing the instructions and data to implement:* a domain manager to maintain an association between each of the wireless services subscribers and one of a plurality of domains into which the plurality of wireless services subscribers are grouped, each domain corresponding to a different subset of the plurality of wireless services subscribers, each said subset of the plurality of wireless services subscribers including more than one wireless services subscriber, each of the domains further corresponding to a particular billing relationship between a business entity and the corresponding subset of the plurality of wireless services subscribers, each of the domains having assigned thereto a particular set of digital products designed for use in wireless communication devices that are accessible to the wireless services subscribers in that domain;

a product manager to manage publication of digital products designed for use in wireless communication devices on the system by the plurality of digital products suppliers;

a delivery manager to manage delivery of an item of digital products designed for use in wireless communication devices to a wireless communications device of a requesting subscriber via a wireless network in conjunction with a received request for the item of digital products; and a payment manager to execute a payment process for charging the requesting subscriber for the item of digital products.

21. A system as recited in claim 20, further comprising:

a product catalog containing descriptions of available digital products, and a pricing manager to determine and indicate a price for an item of digital products in response to a signal from the wireless communications device of the requesting subscriber, wherein the price is determined according to a domain of which the requesting subscriber is a member.

22. A system as recited in claim 20, wherein each of the subscribers is a member of exactly one domain of the plurality of domains.

23. A system as recited in claim 20, wherein the plurality of domains corresponds to a delegation of administrative responsibilities for the digital products and the subscribers.

24. A method as recited in claim 23, wherein:

each of the subscribers is a member of exactly one of the domains.

25. A system as recited in claim 20, the plurality of domains further being defined such that each of the subscribers is able to view descriptions of digital products for a domain with which the subscriber is associated but is not able to view descriptions of digital products of any domain with which the subscriber is not associated.

26. A system as recited in claim 20, the domain manager further to enable specification, for each of the domains, of a language for purposes of allowing wireless services subscribers to identify and obtain digital products, where the language for each domain can be set independently of the language of every other domain; and the domain manager further to enable specification, for each of the domains, of currency in which digital products is to be expressed to wireless subscribers for purposes of wireless services subscribers obtaining digital products, where the currency for each domain can be set independently of the currency of every other domain.

27. A system to manage publication and delivery of digital products to users of a plurality of wireless [communications] *communication* devices operating on a wireless network, the users being wireless services subscribers, the plurality of wireless [client] *communication* devices being registered to and operable by the users to access the wireless services, the system comprising:

*memory for storing instructions and data; and*

*one or more processors for processing the instructions and data to implement:* a domain manager to maintain data defining an association between each of the subscribers and one of a plurality of domains into which the subscribers are grouped, each domain defined as a group of the wireless services subscribers and including a different subset of the plurality of subscribers, each of the domains corresponding to a particular billing relationship between a business entity and a particular subset of the plurality of subscribers, each subscriber being a member of exactly one of the domains, each said subset of the plurality of wireless services subscribers including more than one wireless services subscriber, each of the domains having assigned thereto a particular set of digital products designed for use in wireless communication devices that are accessible to the wireless services subscribers in that domain;

a set of protocol handlers, each protocol handler to enable the system to communicate with wireless [client] *communication* devices over at least one wireless network using a separate associated protocol;

a product manager to manage submission and publication of digital products by a plurality of digital products suppliers, wherein the product manager includes a product catalog containing descriptions of available digital products, and a pricing manager to determine and indicate a price for an item of digital products in response to a signal from a wireless [communications] *communication* device of the plurality of wireless [communications] *communication* devices, wherein the price is determined according to a domain in which a requesting subscriber is included;

a delivery manager to manage delivery of the item of digital products to the mobile [client] *communication* device via at least one wireless network in conjunction with a received request for the item of digital products; and a payment manager to execute a payment process for charging the requesting subscriber for rights to use the item of digital products.

28. A system as recited in claim 27, the plurality of domains further being defined such that each of the subscribers is able to view descriptions of digital products for a domain with which the subscriber is associated but is not able to view descriptions of digital products of any domain with which the subscriber is not associated.

29. A system as recited in claim 28, the domain manager further to enable specification, for each of the domains, of a language for purposes of allowing wireless services subscribers to identify and obtain digital products, where the language for each domain can be set independently of the language of every other domain; and the domain manager further to enable specification, for each of the domains, of a currency in which digital products is to be expressed to wireless subscribers for purposes of wireless services subscribers obtaining digital products, where the currency for each domain can be set independently of the currency of every other domain.

*30. A method of providing access to digital merchant offerings for use in wireless communication devices, the method comprising:*

*providing at a server system domain data defining a plurality of domains, each domain corresponding to a different subset of a plurality of wireless services subscribers, each said subset of the plurality of wireless services subscribers including more than one wireless services subscriber, each of the domains further corresponding to a particular billing relationship between a business entity and the corresponding subset of the plurality of wireless services subscribers, each of the domains having assigned thereto to a particular set of digital merchant offerings available for use in wireless communication devices that are accessible to the wireless services subscribers in that domain;*

*operating the server system to enable a plurality of digital products suppliers to provide access through the server system digital merchant offerings available for use in wireless communication devices via a computer network such that the digital products are accessible to the plurality of wireless services subscribers; and*

*operating the server system to enable wireless services subscribers in each of the plurality of domains to acquire the digital merchant offerings via at least one wireless network and to use the acquired digital merchant offerings on associated wireless communication devices.*

*31. The method of claim 30, where the associated wireless communication devices include cellular telephones that are configured for functions in addition to telephony, the functions including one or more of: playing games, accessing World Wide Web pages, exchanging email, exchanging and downloading files, exchanging short messaging service (SMS) messages, and sending and receiving video.*

*32. The method of claim 30, wherein the merchant offerings are provided from a centralized store.*

*33. The method of claim 30, wherein the merchant offerings are provided from a centralized store and embody at least one of: a data set for a game application, a data set for an applet; a data set for an image; a data set for a screensaver; a wallpaper data set; and a data set for a ring tone.*

*34. A system, comprising:*

*a server configured for providing access to digital merchant offerings for use in wireless communication devices, and further configured for providing at a server system domain data defining a plurality of domains, each domain corresponding to a different subset of a plurality of wireless services subscribers, each said subset of the plurality of wireless services subscribers including more than one wireless services subscriber, each of the domains further corresponding to a particular billing relationship between a business entity and the corresponding subset of the plurality of wireless services subscribers, each of the domains having assigned thereto to a particular set of digital merchant offerings available for use in wireless communication devices that are accessible to the wireless services subscribers in that domain; and*

*wherein the server system operates to enable a plurality of digital products suppliers to provide access through the server system digital merchant offerings available for use in wireless communication devices via a computer network such that the digital products are accessible to the plurality of wireless services subscribers, and to enable wireless services subscribers in each of the plurality of domains to acquire the digital merchant offerings via at least one wireless network and to use the acquired digital merchant offerings on associated wireless communication devices.*

* * * * *

UNITED STATES PATENT AND TRADEMARK OFFICE

CERTIFICATE OF CORRECTION

PATENT NO. : RE43,113 E
APPLICATION NO. : 12/622322
DATED : January 17, 2012
INVENTOR(S) : Rikard M. Kjellberg et al.

It is certified that error appears in the above-identified patent and that said Letters Patent is hereby corrected as shown below:

In the Specification

Column 1, lines 14-17:

"This application claims the benefit of U.S. provisional patent application nos: 60/393,024; 60/392,383; 60/393,041; and 60/392,999, each of which was filed on Jun. 28, 2002, and each of which is incorporated herein by reference."

should read

-- More than one reissue application has been filed for the reissue of U.S. Patent No. 7,299,033. Reissue application Ser. No. 14/144,433 filed Dec. 30, 2013 is a continuation reissue application of reissue application Ser. No. 13/351,173 filed Jan. 16, 2012 (now abandoned), which is a continuation reissue application of the present reissue application Ser. No. 12/622,322 filed Nov. 19, 2009, now U.S. Reissue Patent No. RE43,113, which is a reissue of U.S. Patent No. 7,299,033 issued Nov. 20, 2007, which issued from patent application Ser. No. 10/601,022 filed Jun. 19, 2003, which claims the benefit of U.S. provisional patent application nos: 60/393,024; 60/392,383; 60/393,041; and 60/392,999, each of which was filed on Jun. 28, 2002, and each of which is incorporated herein by reference. --

Signed and Sealed this
Eleventh Day of November, 2014

Michelle K. Lee

Michelle K. Lee
*Deputy Director of the United States Patent and Trademark Office*